US012810129B2

(12) United States Patent
Pan et al.

(10) Patent No.: US 12,810,129 B2
(45) Date of Patent: Nov. 24, 2026

(54) NEUROMORPHIC COMPUTER SUPPORTING BILLIONS OF NEURONS

(71) Applicant: ZHEJIANG UNIVERSITY, Hangzhou (CN)

(72) Inventors: Gang Pan, Hangzhou (CN); De Ma, Hangzhou (CN); Yitao Li, Hangzhou (CN); Shuhua Dai, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 723 days.

(21) Appl. No.: 18/036,561

(22) PCT Filed: Nov. 12, 2020

(86) PCT No.: PCT/CN2020/128468

§ 371 (c)(1),
(2) Date: May 11, 2023

(87) PCT Pub. No.: WO2022/099559

PCT Pub. Date: May 19, 2022

(65) Prior Publication Data

US 2023/0409890 A1 Dec. 21, 2023

(30) Foreign Application Priority Data

Nov. 11, 2020 (CN) ......................... 202011255472.3

(51) Int. Cl.
*G06N 3/063* (2023.01)
*G06N 3/049* (2023.01)

(52) U.S. Cl.
CPC ............. *G06N 3/063* (2013.01); *G06N 3/049* (2013.01)

(58) Field of Classification Search
None
See application file for complete search history.

(56) References Cited

U.S. PATENT DOCUMENTS

2019/0080229 A1 3/2019 Modha
2019/0266481 A1 * 8/2019 Amir ...................... G06N 3/049

FOREIGN PATENT DOCUMENTS

CN 105719000 6/2016
CN 110322010 10/2019
CN 110909869 3/2020

OTHER PUBLICATIONS

Mavrovouniotis ML, Chang S. Hierarchical neural networks. Computers & chemical engineering. Apr. 1, 1992; 16(4):347-69. (Year: 1992).*

(Continued)

*Primary Examiner* — Vincent Gonzales
(74) *Attorney, Agent, or Firm* — Jiwen Chen; JOYWIN IP LAW PLLC

(57) ABSTRACT

The present invention discloses a neuromorphic computer supporting billions of neurons, comprising hierarchical extended architecture and algorithmic process control within the architecture; the architecture comprises multiple neuromorphic computing chips with hierarchical organization management for implementing computing tasks, each containing computing neurons and synaptic resources and forming a neural network, spike events between computing neurons within the architecture are transmitted through a hierarchical transmission mode; the algorithmic process control comprises controlling parallel processing of computing tasks within the architecture, controlling management of synchronization time within the architecture, and controlling reconstruction of neural networks within the architecture to achieve fault tolerance and robust management of computing neurons and synaptic resources. The neuromorphic computer can support spiking neural network inference calculations with a neuron scale of billions.

7 Claims, 3 Drawing Sheets

(56) References Cited

OTHER PUBLICATIONS

Xin, Zhiyuan, "Zhejiang University Unveils China's Largest Brain-Like Computer with 792 Chips and 100 Million Neurons" https://baijiahao.baidu.com/s?id=1676795412895565985&wfr=spider&for=pc, Sep. 3, 2020 English translation (Machine translation) provided.

* cited by examiner

NEUROMORPHIC COMPUTER SUPPORTING BILLIONS OF NEURONS

This is a U.S. national stage application of PCT Application No. PCT/CN2020/128468 under 35 U.S.C. 371, filed Nov. 12, 2020 in Chinese, claiming priority of Chinese Application No. 202011255472.3, filed Nov. 11, 2020, all of which are hereby incorporated by reference.

FIELD OF TECHNOLOGY

The present invention belongs to the field of artificial neural network technology, and specifically relates to a neuromorphic computer supporting billions of neurons.

BACKGROUND TECHNOLOGY

Since the introduction of the von Neumann architecture in 1945, computers based on this architecture have been used to this day, with the basic feature of separating memory and computing units. The advantage of disaggregation of compute and storage is software programmability, which means that the same hardware platform can perform different functions by storing different software. The disadvantage is that communication between storage units and computing units can become a performance bottleneck. Thanks to the rapid development of the semiconductor industry in accordance with Moore's Law, the computing performance of the von Neumann architecture has grown exponentially for decades, in recent years, the "memory wall" and "power wall" effects have become increasingly serious, Moore's Law has gradually become invalid, and the performance dividend obtained through process progress has gradually weakened. In the post Moore era, the semiconductor industry urgently needs to seek new architectures and methods to meet the continuously improving computing performance and extremely low power consumption needs of the electronics industry. With the development of brain science, people gradually understand that the human brain is a highly efficient computer, and neuromorphic computing has emerged. The integration of memory and computing units fundamentally eliminates the "memory wall" problem of the classical von Neumann architecture. The basic idea of neuromorphic computing is to apply the concept of biological neural networks to computer system design, aiming to improve performance and reduce power consumption for specific applications of intelligent information processing. Due to its unique advantages in real-world learning tasks, it has quickly become a research hotspot in the industry.

In 2004, Stanford University professor Kwabena Boahen developed the neuromorphic chip Neurogrid based on analog circuits. In 2005, the University of Manchester in the UK began developing a multi-core supercomputer SpiNNaker based on ARM, mainly using ARM to simulate neurons, in 2018, it reached a scale of 1 million cores, but with high power consumption. In 2014, IBM released the neuromorphic chip TrueNorth under the support of DARPA's SyNapse project, supporting millions of spike neurons and hundreds of millions of synapses. In 2015, the Swiss Federal Institute of Technology in Zurich released an extremely low-power neuromorphic chip based on a mixed digital and analog circuit. In the same year, Zhejiang University collaborated with Hangzhou Dianzi University to release the Darwin1. In 2018, chip giant Intel unveiled its first self-learning chip, Loihi. In 2019, Tsinghua University released Tianjic of ANN hybrid SNN.

Although neuromorphic chip has developed rapidly, due to the limited function of a single neuron, only millions of neurons can work together to demonstrate unique advantages in specific intelligent information processing. Therefore, the integration of neuromorphic chip to achieve large-scale neurons has always been a popular direction, and research on large-scale neuromorphic computers is also flourishing. In 2015, the EU Brain Program launched BrainScale S, which assembled 20 wafers into a computing system, reaching a scale of 4 million neurons; in 2017, IBM released a Blue Raven based on the TrueNorth chip, with a scale of 64 million neurons and a power consumption of only 60 W; in 2020, Intel released the Pohiki Springs based on the Loihi chip, reaching a scale of 100 million neurons; in the same year, Zhejiang University and Zhejiang LAB released Darwin Mouse, reaching a scale of 120 million neurons at an international leading level. The scale of neuromorphic computer is increasing, but the specific implementation is definitely not simply stacking neuromorphic chips. It will face a series of problems such as spike data transmission bottlenecks, algorithm time synchronization between tasks, and the improvement of large-scale computing resource failure rate, which is of great research significance.

SUMMARY OF THE INVENTION

The purpose of the present invention is to provide a neuromorphic computer supporting billions of neurons, enabling it to support spiking neural network inference calculations with a neuron scale of billions.

To achieve the above invention objectives, the technical solution provided by the present invention is:

A neuromorphic computer supporting billions of neurons, comprising hierarchical extended architecture and algorithmic process control within the architecture;

the architecture comprises multiple neuromorphic computing chips with hierarchical organization management for implementing computing tasks, each containing computing neurons and synaptic resources and forming a neural network, spike events between computing neurons within the architecture are transmitted through a hierarchical transmission mode;

the algorithmic process control comprises controlling parallel processing of computing tasks within the architecture, controlling management of synchronization time within the architecture, and controlling reconstruction of neural networks within the architecture to achieve fault tolerance and robust management of computing neurons and synaptic resources.

Preferably, the architecture adopts a three-level hierarchical organization management approach, comprising:

primary organization management: the architecture comprises multiple neuromorphic computing nodes organized in a tree topology, and low-speed communication is used between various neuromorphic computing nodes;

secondary organization management: each neuromorphic computing node comprises multiple cascade chips organized in a grid topology, and high-speed communication is used between the cascade chips;

tertiary organization management: each cascade chip contains multiple neuromorphic computing chips organized in a matrix array structure, and ultra high-speed communication is used between the neuromorphic computing chips.

Preferably, for primary organization management, Ethernet communication is used between various neuromorphic computing nodes; for secondary organization management, field programmable gate array (FPGA) communication mode is adopted between all cascade chips; for tertiary organization management, high-speed asynchronous interface communication is adopted between various neuromorphic computing chips.

Preferably, the spike events between computing neurons within the architecture are transmitted through a hierarchical transmission mode, comprising:

The spike events transmission between two computing neurons in the cascade chip, the source computing neuron sends a spike data packet containing the target computing neuron, the spike data packet is routed to the high-speed asynchronous interface by the Network On Chip routing unit contained in the neuromorphic computing chip where the source computing neuron is located and directly transmitted to the target neuromorphic computing chip, then, the Network On Chip routing unit of the target neuromorphic computing chip transmits the spike data packet to the target computing neuron, which is the spike events communication mode within the cascade chip.

The spike events transmission between two computing neurons between cascade chips, the source computing neuron sends a spike data packet containing the identification information of the target computing neuron, since the target computing neuron is outside the cascade chip where the source computing neuron is located, the spike data packet is routed from the Network On Chip routing unit contained in the neuromorphic computing chip where the source computing neuron is located to the interconnection structure between cascade chips, the interconnection structure between cascade chips transfers the spike data packet to the target cascade chip where the computing neuron is located, the target cascade chip transmits the spike packet to the target computing neuron according to the spike events communication mode within the cascade chips, which is the spike events communication mode between the cascade chips.

The spike events transmission between two computing neurons between neuromorphic computing nodes, the source computing neuron sends a spike data packet containing the identification information of the target computing neuron, since the target computing neuron is outside the cascade chip where the source computing neuron is located, the spike data packet is routed from the Network On Chip routing unit contained in the neuromorphic computing chip where the source computing neuron is located to the interconnection structure between the cascade chips, the interconnection structure between cascade chips transfers the spike data packet to a higher-level interconnection structure between nodes, the interconnection structure between nodes transfers the spike data packet to the interconnection structure between cascade chips of the target neuromorphic computing node where the target computing neuron is located, the interconnection structure between cascade chips transfers the spike data packet to the target computing neuron through the spike events communication mode between the cascade chips.

Preferably, based on the architecture, multiple computing tasks are controlled to be mapped to multiple computing neuromorphic computing nodes for parallel execution, and each computing neuromorphic computing node independently executes the assigned computing task.

Preferably, based on the architecture, controlling various hierarchical organization management using asynchronous event driven working mechanisms to achieve synchronous management, ensuring the asynchronous progress of different computing tasks; simultaneously controlling the entire architecture using global synchronization signals to ensure time synchronization management of the same computing task.

Preferably, based on the architecture, the same computing task mapped to multiple neuromorphic computing nodes is transformed into a single neuromorphic computing node by reconstructing the neural network structure, and the computing task is completed by a single neuromorphic computing node, achieving robust management of computing neurons and synaptic resources.

Preferably, based on the architecture, when a neuromorphic computing node executing a computing task occurs fault, controlling the conversion of the computing task executed by the faulty neuromorphic computing node to a backup neuromorphic computing node by reconstructing the neural network structure, achieving fault tolerance management of computing neural elements and synaptic resources.

Comparing to existing technologies, the beneficial effects of the present invention at least comprise:

The neuromorphic computer supporting billions of neurons provided by the present invention, and through the hierarchical extended architecture composed of neuromorphic computing chips, combined with parallel processing of computing tasks, synchronous time management, and neural network reconstruction to achieve fault tolerance and robust management of computing neurons and synaptic resources, it can achieve spiking neural network inference calculations that support billions of neurons.

BRIEF DESCRIPTION OF THE DRAWINGS

In order to provide a clearer explanation of the embodiments of the present invention or the technical solutions in the prior art, a brief introduction will be given to the accompanying drawings required in the description of the embodiments or prior art. It is evident that the accompanying drawings in the following description are only some embodiments of the present invention. For ordinary technical personnel in the art, other accompanying drawings can be obtained based on these drawings without any creative effort.

DETAILED DESCRIPTION OF THE EMBODIMENTS

Figure 1:
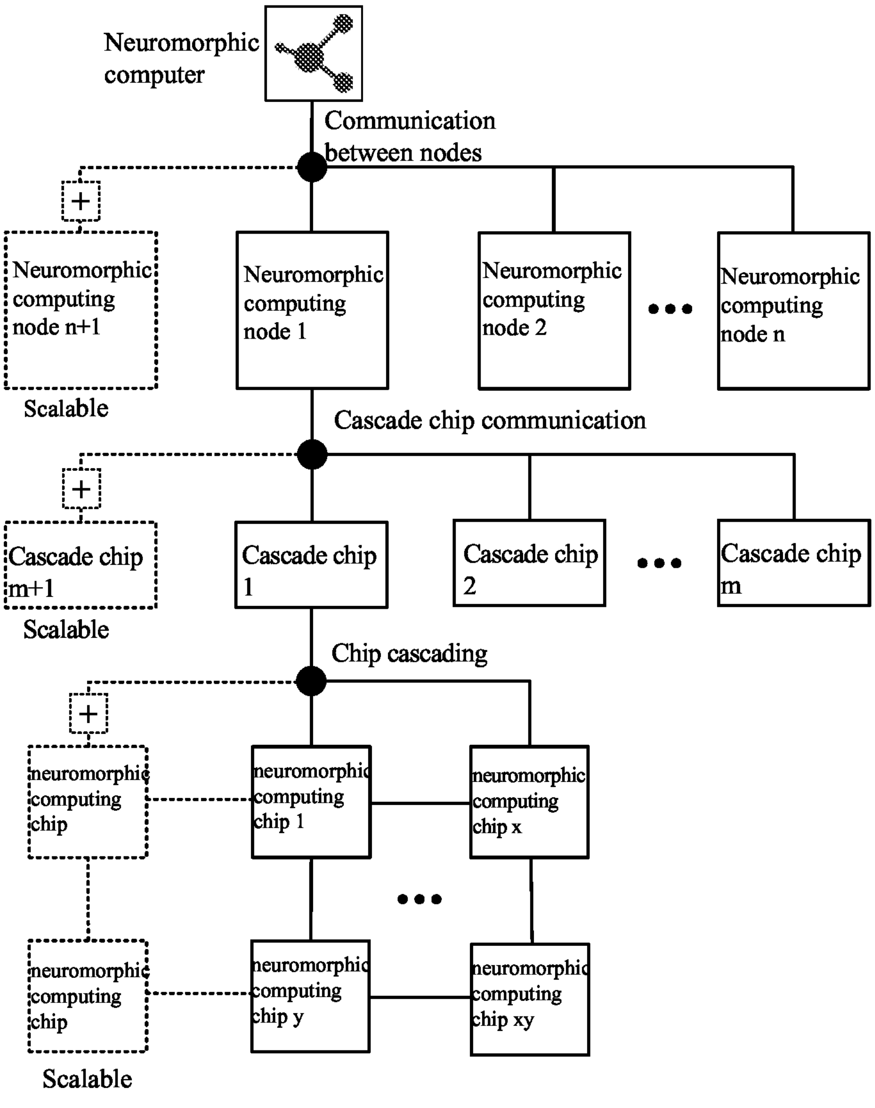
FIG. 1 is a schematic diagram of the architecture of a neuromorphic computer supporting billions of neurons provided by the embodiment of the present invention.

In order to make the purpose, technical solution, and advantages of the present invention clearer, the following is a further detailed explanation of the present invention in conjunction with the accompanying drawings and embodiments. It should be understood that the specific embodiments described here are only used to explain the present invention and do not limit the scope of protection of the present invention.

The embodiment provides a neuromorphic computer supporting billions of neurons. It is mainly divided into two aspects: hierarchical and easily scalable neuromorphic computer architecture, and efficient and orderly neuromorphic computer algorithmic process control. The architecture adopts a hierarchical organizational approach to organize computing resources, supporting multilevel computing neurons interconnection and spike events communication, simulating the regionality of biological neurons; supporting flexible and scalable neuromorphic computing resources, reaching a scale of billions of neurons. In the aspect of algorithmic process control, it supports parallel execution of multiple computing tasks, and the same computing task uses global synchronization signal to ensure algorithm time synchronization; adopting an asynchronous event driven working mechanism to achieve lower power consumption; replacing faulty computing nodes through neural network reconstruction to improve the fault tolerance and robust of neurons and synaptic resources.

The architecture of the neuromorphic computer provided by the embodiment comprises multiple neuromorphic computing chips with hierarchical organization management for implementing computing tasks, each containing computing neurons and synaptic resources and forming a neural network, spike events between computing neurons within the architecture are transmitted through a hierarchical transmission mode.

Specifically, the architecture adopts a three-level hierarchical organization management approach, comprising: primary organization management: the architecture comprises multiple neuromorphic computing nodes organized in a tree topology, and low-speed communication is used between various neuromorphic computing nodes, corresponding to the biological nervous system, various neuromorphic computing nodes handle separate tasks or collaborate to complete tasks with less communication; secondary organization management: each neuromorphic computing node comprises multiple cascade chips organized in a grid topology, and high-speed communication is used between the cascade chips; tertiary organization management: each cascade chip contains multiple neuromorphic computing chips organized in a matrix array structure, and ultra high-speed communication is used between the neuromorphic computing chips, for example, high-speed asynchronous communication interface is used for communication. Referring to the regional nature of communication between biological neurons, the volume of communication data should gradually increase, and the architecture provided in the embodiment is well in line with this phenomenon.

Due to the hierarchical organization management approach adopted in the neuromorphic computer architecture, it can support flexible and scalable computing resources, which means that each level supports the expansion of computing resources on the existing interconnection topology structure to meet large-scale needs and support the number of billions of neurons.

FIG. 1 is a schematic diagram of the architecture of the neuromorphic computer supporting billions of neurons provided by the embodiment of the present invention. As shown in FIG. 1, the neuromorphic computer adopts a three-level hierarchical architecture, the neuromorphic computer comprises n neuromorphic computing nodes, each type of neuromorphic computing node processes individual tasks or cooperates to complete tasks with less communication, the nodes adopt a relatively low-speed communication mode. In this embodiment, Ethernet is used to achieve this communication interconnection structure, and various types of neuromorphic computing nodes are connected according to the tree topology; each neuromorphic computing node contains m cascade chips, and a relatively high-speed communication mode is adopted between the cascade chips. In this embodiment, FPGA logic is used to realize this high-speed communication interconnection structure, and the cascade chips are connected according to the grid topology; inside each cascade chip, it is composed of x*y total xy neuromorphic computing chips interconnected, high speed asynchronous interfaces are used between chips, and each chip is connected according to grid topology. Assuming that each neuromorphic computing chip contains i neurons and j synapses, then each cascade chip contains x*y*i neurons and x*y*j synapses; each neuromorphic computing node contains x*y*m*i neurons and x*y*m*j synapses; the entire neuromorphic computer consists of x*y*m*n*i neurons and x*y*m*n*j synapses. Moreover, there is a three-level hierarchical neuromorphic computer organization approach, with each level supporting the expansion of computing resources on the existing interconnection topology to meet the needs of ultra large scales and support the number of billions of neurons.

The neuromorphic computer architecture supports interconnection between multi-level neurons and spike events communication, based on the hierarchical three-level organization management approach, computing neurons can communicate with other neuromorphic computing chips through spike events communication only through interconnection between neuromorphic computing chips; it can also be interconnected through cascade chips to communicate with farther neurons; collaboration tasks can also be completed through interconnections between neuromorphic computing nodes. Similar to the regional nature of communication between biological neurons, the higher the communication cost at the higher level, the smaller the relative data volume.

Figure 2:
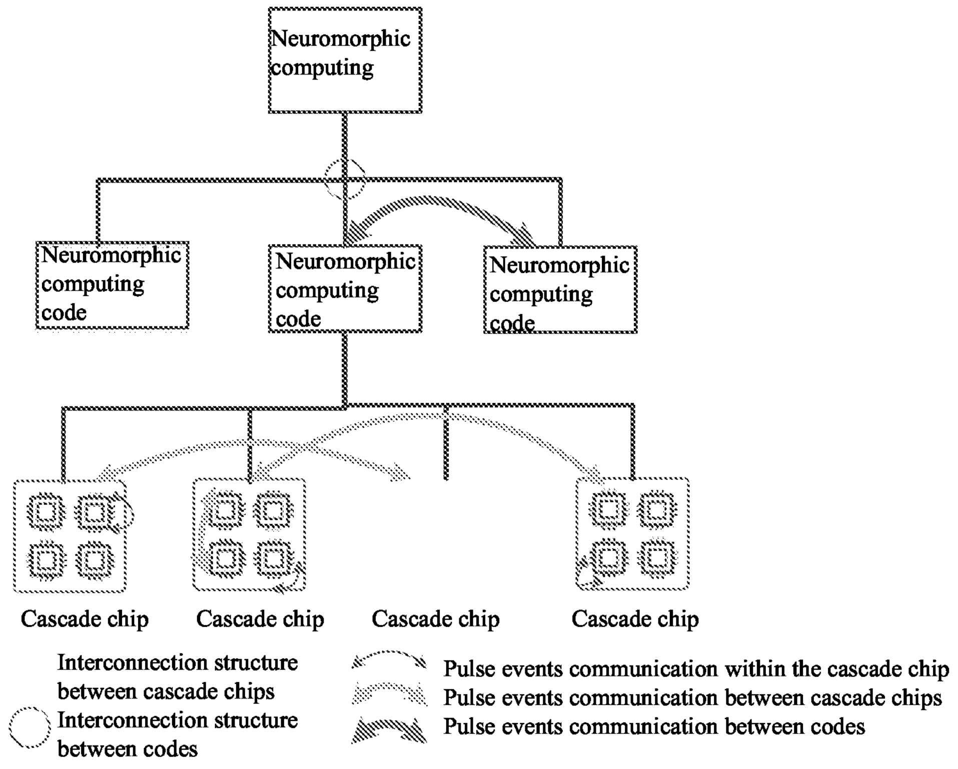
FIG. 2 is a schematic diagram of the spike events transmission between computing neurons within the architecture provided by the embodiment of the present invention.

FIG. 2 is a schematic diagram of spike events transmission between computing neurons within the architecture provided by the embodiment of the present invention. As shown in FIG. 2, based on the three-level hierarchical architecture of the neuromorphic computer, each level computes the spike events between neurons using corresponding interconnection structures for efficient communication. For the spike events communication between two computing neurons in the cascade chip, the source computing neuron sends a spike data packet containing the target computing neuron, the spike data packet is routed to the high-speed asynchronous interface by the Network On Chip routing unit contained in the neuromorphic computing chip where the source computing neuron is located and directly transmitted to the target neuromorphic computing chip, then, the Network On Chip routing unit of the target neuromorphic computing chip transmits the spike data packet to the target computing neuron, which is the spike events communication mode within the cascade chip.

The spike events transmission between two computing neurons between cascade chips, the source computing neuron sends a spike data packet containing the identification information of the target computing neuron, since the target computing neuron is outside the cascade chip where the source computing neuron is located, the spike data packet is routed from the Network On Chip routing unit contained in the neuromorphic computing chip where the source computing neuron is located to the interconnection structure between cascade chips, the interconnection structure between cascade chips transfers the spike data packet to the target cascade chip where the computing neuron is located, the target cascade chip transmits the spike packet to the target computing neuron according to the spike events communication mode within the cascade chips, which is the spike events communication mode between the cascade chips.

The spike events transmission between two computing neurons between neuromorphic computing nodes, the source computing neuron sends a spike data packet containing the identification information of the target computing neuron, since the target computing neuron is outside the cascade chip where the source computing neuron is located, the spike data packet is routed from the Network On Chip routing unit contained in the neuromorphic computing chip where the source computing neuron is located to the interconnection structure between the cascade chips, the interconnection structure between cascade chips transfers the spike data packet to a higher-level interconnection structure between nodes, the interconnection structure between nodes transfers the spike data packet to the interconnection structure between cascade chips of the target neuromorphic computing node where the target computing neuron is located, the interconnection structure between cascade chips transfers the spike data packet to the target computing neuron through the spike events communication mode between the cascade chips.

Based on the architecture with hierarchical organization management, the neuromorphic computer provided by the present invention can support parallel execution of multiple computing tasks, and multiple computing tasks are controlled to be mapped to multiple computing neuromorphic computing nodes for parallel execution, and each computing neuromorphic computing node independently executes the assigned computing task, independent computing tasks do not require communication between nodes. For small-scale computing tasks, they can be directly mapped to one neuromorphic computing node and mapped to different cascade chips within the neuromorphic computing node, so that only communication between cascade chips is required.

Based on the architecture with hierarchical organization management, the neuromorphic computer provided by the present invention can support synchronous management of the neuromorphic computer according to asynchronous event driven working mechanisms, the asynchronous event driven working mechanism is adopted between various neuromorphic computing nodes, various cascade chips, and various neuromorphic computing chips to achieve lower power consumption; simultaneously using global synchronization signals to ensure time synchronization of algorithm level; the calculations of different computing tasks are carried out asynchronously, and the calculations within each computing task maintain synchronization at the algorithm level.

Figure 3:
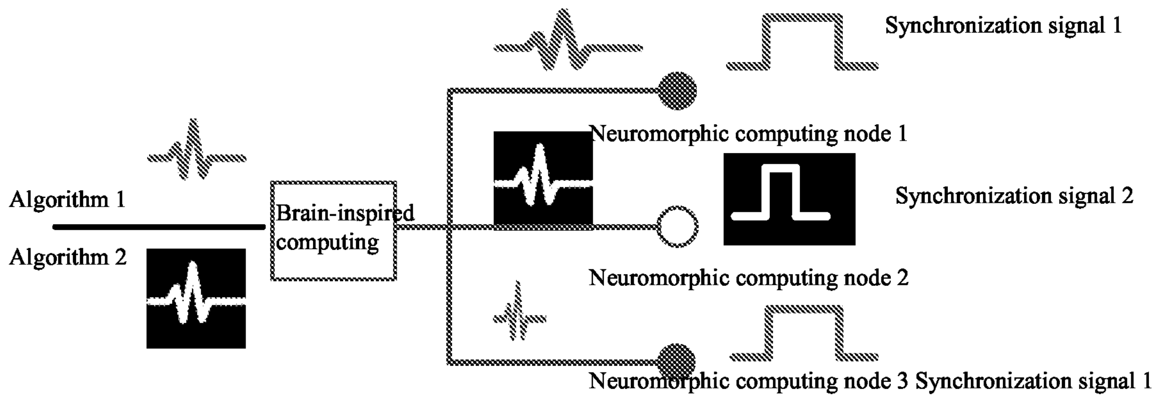
FIG. 3 is a schematic diagram of a synchronization time management example of a neuromorphic computer provided in the embodiment of the present invention.

FIG. 3 is a schematic diagram of a synchronization time management example of the neuromorphic computer provided in the embodiment of the present invention. As shown in FIG. 3, Algorithm 1 is jointly undertaken by neuromorphic computing node 1 and neuromorphic computing node 3, they asynchronously complete their respective operations under the drive of independent spike events, but are controlled by the same global synchronization signal 1 to process further transmission of spike events synchronously. Algorithm 2 is carried out by neuromorphic computing node 2, due to its independence from Algorithm 1, it completes the required operations under its own spike event drive and is controlled by synchronization signal 2 for further transmission of spike events.

Based on the architecture with hierarchical organization management, the neuromorphic computer provided by the present invention can support neural network connectivity and reconfigurability to achieve fault tolerance and robust management of computing neurons and synaptic resources. The same neural network can easily convert mapping schemes as needed, reconstruct a more optimal structure while following the topology, and allocate the data transmission bottleneck parts to chip level interconnects with fast communication speed to improve overall performance. At the same time, according to the fault tolerance of biological neurons, the calculation error of individual neurons will not affect the overall function of the system; when a faulty computing node occurs, a backup node will be enabled and replaced through neural network reconstruction to achieve higher fault tolerance and robust.

Figure 4:
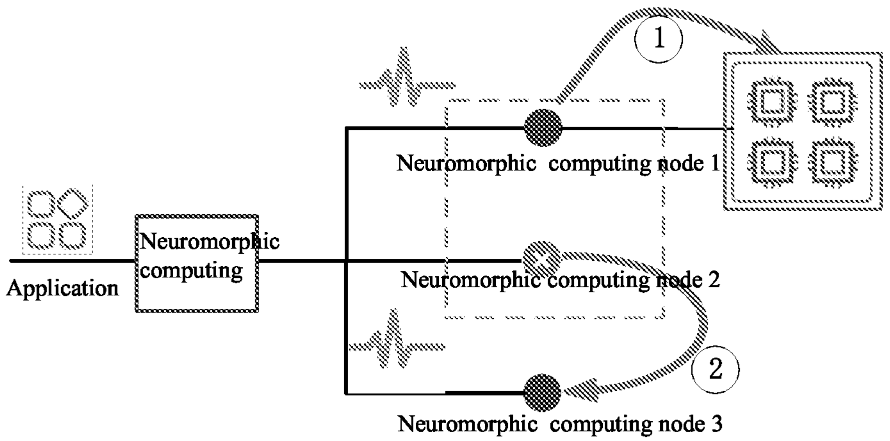
FIG. 4 is a schematic diagram of the fault tolerance and robust management example of a neuromorphic computer provided by the embodiment of the present invention.

FIG. 4 is a schematic diagram of the fault tolerance and robust management example of the neuromorphic computer provided by the embodiment of the present invention. As shown in the case (1) in FIG. 4, the resources required for the neural network structure established for the algorithm task can be met within a single node, when the network structure is mapped to multiple neuromorphic computing nodes, the network structure is reconstructed through neural network connection to transfer the mapping to a single neuromorphic computing node, thereby improving performance. As shown in the case (2) in FIG. 4, the algorithm task of an application initially runs stably on the neuromorphic computing node 2. Due to some reason, the neuromorphic computing node 2 fails and cannot complete the correct operation, the neuromorphic computing node 3 will be enabled as a backup node, and the corresponding algorithm task will be migrated to the neuromorphic computing node 3, so that the neuromorphic computing task continues to run effectively.

In the neuromorphic computers that support billions of neurons provided above, referring to the hierarchical neuromorphic computer architecture of the biological nervous system, fully utilizing the regional nature of neuronal communication can increase the upper limit of the system's neuronal synapse size; and the three-level tree hierarchical architecture described can be flexibly expanded at each level, enabling neuromorphic computing applications at the scale of billions of neurons.

The neuromorphic computer supporting billions of neurons can support parallel execution of multiple tasks, and different tasks work asynchronously, in the same task, the global signal is used to ensure the synchronization of algorithm time, which improves the computing efficiency and reduces power consumption.

The aforementioned neuromorphic computer supporting billions of neurons can support multi-level interconnection and spike events communication between neurons, and can be reconstructed through neural network connections to reallocate computing resources to flexibly adapt to various needs.

The above-mentioned neuromorphic computer supporting billions of neurons can support high fault tolerance and robust, and the calculation errors of individual neurons and the failure of individual neuromorphic computing nodes will not affect the whole system.

The specific implementation methods mentioned above provide a detailed explanation of the technical solution and beneficial effects of the present invention. It should be understood that the above are only the optimal embodiments of the present invention and are not intended to limit the present invention. Any modifications, supplements, and equivalent replacements made within the scope of the principles of the present invention should be included in the scope of protection of the present invention.

The invention claimed is:

1. A neuromorphic computer supporting billions of neurons, comprising hierarchical extended architecture and algorithmic process control within the architecture;

the architecture comprises multiple neuromorphic computing chips with hierarchical organization management for implementing computing tasks, each containing computing neurons and synaptic resources and forming a neural network, spike events between computing neurons within the architecture are transmitted through a hierarchical transmission mode;

the algorithmic process control comprises controlling parallel processing of computing tasks within the architecture, controlling management of synchronization time within the architecture, and controlling reconstruction of neural networks within the architecture to achieve fault tolerance and robust management of computing neurons and synaptic resources;

wherein, the architecture adopts a three-level hierarchical organization management approach, comprising:

primary organization management: the architecture comprises multiple neuromorphic computing nodes organized in a tree topology, and Ethernet communication is used between various neuromorphic computing nodes;

secondary organization management: each neuromorphic computing node comprises multiple cascade chips organized in a grid topology, and field programmable gate array (FPGA) communication mode is used between the cascade chips; and tertiary organization management: each cascade chip contains multiple neuromorphic computing chips organized in a matrix array structure, and high-speed asynchronous interface communication is used between the neuromorphic computing chips;

wherein, the spike events between computing neurons within the architecture are transmitted through a hierarchical transmission mode, comprising:

the spike events transmission between two computing neurons in the cascade chip, the source computing neuron sends a spike data packet containing the target computing neuron, the spike data packet is routed to the high-speed asynchronous interface by a Network On Chip routing unit contained in the neuromorphic computing chip where the source computing neuron is located and directly transmitted to the target neuromorphic computing chip, then, the Network On Chip routing unit of the target neuromorphic computing chip transmits the spike data packet to the target computing neuron, which is the spike events communication mode within the cascade chip;

the spike events transmission between two computing neurons between cascade chips, the source computing neuron sends a spike data packet containing the identification information of the target computing neuron, since the target computing neuron is outside the cascade chip where the source computing neuron is located, the spike data packet is routed from the Network On Chip routing unit contained in the neuromorphic computing chip where the source computing neuron is located to the interconnection structure between cascade chips, the interconnection structure between cascade chips transfers the spike data packet to the target cascade chip where the computing neuron is located, the target cascade chip transmits the spike packet to the target computing neuron according to the spike events communication mode within the cascade chips, which is the spike events communication mode between the cascade chips;

the spike events transmission between two computing neurons between neuromorphic computing nodes, the source computing neuron sends a spike data packet containing the identification information of the target computing neuron, since the target computing neuron is outside the cascade chip where the source computing neuron is located, the spike data packet is routed from the Network On Chip routing unit contained in the neuromorphic computing chip where the source computing neuron is located to the interconnection structure between the cascade chips, the interconnection structure between cascade chips transfers the spike data packet to a higher-level interconnection structure between nodes, the interconnection structure between nodes transfers the spike data packet to the interconnection structure between cascade chips of the target neuromorphic computing node where the target computing neuron is located, the interconnection structure between cascade chips transfers the spike data packet to the target computing neuron through the spike events communication mode between the cascade chips;

wherein, based on the architecture, controlling various hierarchical organization management using asynchronous event driven working mechanisms to achieve synchronous management, ensuring the asynchronous progress of different computing tasks; simultaneously controlling the entire architecture using global synchronization signals to ensure time synchronization management of the same computing task; and wherein, based on the architecture, when a neuromorphic computing node executing a computing task occurs fault, controlling the conversion of the computing task executed by the faulty neuromorphic computing node to a backup neuromorphic computing node by reconstructing the neural network structure, achieving fault tolerance management of computing neurons and synaptic resources.

2. The neuromorphic computer supporting billions of neurons according to claim 1, wherein, based on the architecture, multiple computing tasks are controlled to be mapped to multiple computing neuromorphic computing nodes for parallel execution, and each computing neuromorphic computing node independently executes the assigned computing task.

3. The neuromorphic computer supporting billions of neurons according to claim 1, wherein, based on the architecture, the same computing task mapped to multiple neuromorphic computing nodes is transformed into a single neuromorphic computing node by reconstructing the neural network structure, and the computing task is completed by a single neuromorphic computing node, achieving robust management of computing neurons and synaptic resources.

4. The neuromorphic computer supporting billions of neurons according to claim 1, wherein, based on the architecture, multiple computing tasks are controlled to be mapped to multiple computing neuromorphic computing nodes for parallel execution, and each computing neuromorphic computing node independently executes the assigned computing task.

5. The neuromorphic computer supporting billions of neurons according to claim 1, wherein, based on the architecture, controlling various hierarchical organization management using asynchronous event driven working mechanisms to achieve synchronous management, ensuring the asynchronous progress of different computing tasks; simultaneously controlling the entire architecture using global synchronization signals to ensure time synchronization management of the same computing task.

6. The neuromorphic computer supporting billions of neurons according to claim 1, wherein, based on the architecture, the same computing task mapped to multiple neuromorphic computing nodes is transformed into a single neuromorphic computing node by reconstructing the neural network structure, and the computing task is completed by a single neuromorphic computing node, achieving robust management of computing neurons and synaptic resources.

7. The neuromorphic computer supporting billions of neurons according to claim 1, wherein, based on the architecture, when a neuromorphic computing node executing a computing task occurs fault, controlling the conversion of the computing task executed by the faulty neuromorphic computing node to a backup neuromorphic computing node by reconstructing the neural network structure, achieving fault tolerance management of computing neurons and synaptic resources.

* * * * *